United States Patent [19]

Spiel et al.

[11] Patent Number: 4,734,294

[45] Date of Patent: Mar. 29, 1988

[54] PROCESS FOR MAKING SHREDDED CEREALS

[75] Inventors: Albert Spiel, Yonkers, N.Y.; Aloysius Knipper, Ringwood, N.J.

[73] Assignee: Nabisco Brands, Inc., Parsippany, N.J.

[21] Appl. No.: 861,757

[22] Filed: May 9, 1986

Related U.S. Application Data

[63] Continuation of Ser. No. 441,475, Nov. 15, 1982, abandoned.

[51] Int. Cl.$^4$ .............................................. A23L 1/164
[52] U.S. Cl. .................................. 426/620; 426/462; 426/518; 426/464
[58] Field of Search ............... 426/618, 619, 620, 621, 426/462, 452, 463, 455, 464, 518, 457–461

[56] References Cited

U.S. PATENT DOCUMENTS

| | | |
|---|---|---|
| 502,378 | 8/1883 | Perky et al . |
| 508,086 | 10/1895 | Perky . |
| 897,181 | 8/1908 | Williams . |
| 987,088 | 3/1911 | Perky . |
| 1,019,831 | 3/1912 | Perky . |
| 1,021,473 | 3/1912 | Perky . |
| 1,159,045 | 11/1915 | Kellogg . |
| 1,170,162 | 2/1916 | Kellogg ............................ 426/620 |
| 1,189,130 | 6/1916 | Kellogg . |
| 1,197,297 | 9/1916 | Kellogg ............................ 426/620 |
| 1,210,589 | 1/1917 | Black . |
| 1,321,754 | 11/1919 | Kellogg ............................ 426/621 |
| 1,946,803 | 5/1929 | McKay . |
| 2,008,024 | 7/1935 | Loose . |
| 2,013,003 | 9/1935 | Loose . |
| 2,421,216 | 5/1947 | Penty ............................... 426/621 |
| 2,478,438 | 8/1949 | Thompson et al. .............. 426/620 |
| 3,062,657 | 12/1958 | Vollink . |
| 3,462,277 | 8/1969 | Reinhart . |
| 3,512,990 | 5/1970 | Slaybaugh . |
| 3,640,729 | 2/1972 | Ronai et al. ..................... 99/83 |
| 3,732,109 | 5/1973 | Poat et al. ....................... 99/83 |
| 3,733,206 | 5/1973 | Jensen . |
| 3,787,584 | 1/1974 | Hyldon ............................ 426/620 |
| 4,004,035 | 1/1977 | Hirzel et al. .................... 426/275 |
| 4,179,527 | 12/1979 | White ............................. 426/620 |
| 4,497,840 | 2/1985 | Gould et al. .................... 426/560 |

FOREIGN PATENT DOCUMENTS

| | | | |
|---|---|---|---|
| 674046 | 11/1963 | Canada . | |
| 830044 | 3/1960 | United Kingdom . | |
| 0596209 | 3/1978 | U.S.S.R. ....................... | 426/619 |

OTHER PUBLICATIONS

Shukla, T. "Chemistry of Oats: Chemistry of Oats: Protein Foods and Other Industrial Products," *Critical Reviews in Food Science and Nutrition*, pp. 383–424 (Oct. 1975).

*Primary Examiner*—Raymond N. Jones
*Assistant Examiner*—Marianne M. Cintins
*Attorney, Agent, or Firm*—Richard Kornutik

[57] ABSTRACT

Shredded oat cereals having the unique shredded appearance and eating qualities of shredded wheat are obtained by the process of the present invention. White streaks in the final product, which result from uncooked grain or over-gelatinization, are eliminated by a multistage pressure cooking step, using different amounts of water in each stage. The multi-stage pressure cooking step avoids excessive extraction of water soluble gums and starches and is followed by a cooling step which stops further cooking, partially dehydrates the cooked grain and produces a non-sticky surface on the cooked grain. The non-sticky surface permits movement of the cooked oats through material handling equipment. No tempering of the cooked oats is required before shredding. The cooled product is dried, shredded, and baked. Whole oat groats are preferably used in the multi-stage pressure cooking step of the present invention. Shredded cereals made from other grains, mixtures of other grains, or mixtures of oats with other grains, can be made in the process of the present invention with little, if any, tempering.

21 Claims, No Drawings

PROCESS FOR MAKING SHREDDED CEREALS

This application is a continuation of application Ser. No. 441,475, filed Nov. 15, 1982, now abandoned.

BACKGROUND OF THE INVENTION

1. Field of the Invention

This invention relates to the production of ready-to-eat shredded cereal products and to shredded cereal products.

2. Description of the Prior Art

Several processes are known for the production of ready-to-eat breakfast cereals which are in shredded form. Tempering of the cooked grains prior to shredding has been considered necessary for obtaining strong continuous shreds. In U.S. Pat. Nos. 548,086 and 1,159,045, cooked wheat or similar grains are subjected to tempering times of over 12 hours before shredding. As described in U.S. Pat. No. 4,179,527, in the manufacture of a whole wheat food product such as shredded wheat, whole wheat is cooked sufficiently to gelatinize the starch.

Gelatinization is a function of water penetration into the whole berry, temperature, and time, for a given type of grain. According to U.S. Pat. No. 4,179,527, the gelatinization of wheat starch involves a destruction of bonds in the crystalline regions of starch granules. Retrogradation is the return of the starch molecules to a crystalline structure, which is different from the original crystalline structure, upon cooling. Tempering permits the gelatinized wheat starch to slowly cool and permits water migration through the wheat particles to achieve a uniform water distribution within the particles. Retrogradation occurs during tempering. As reported in U.S. Pat. No. 4,179,527, if shredding is attempted shortly after cooking, the insufficient degree of retrogradation or tempering results in at best, short non-continuous strands and/or strands which are tough, curly, or suffer from other physical or textural disadvantage. In U.S. Pat. No. 4,179,527, the time required for the tempering of cooked whole wheat is substantially reduced by chilling the wheat at a temperature of from 1° C. to about 12° C.

Processes wherein tempering is not specifically mentioned or is indicated as being optional in the production of cereals from wheat or other grains, are disclosed in U.S. Pat. Nos. 1,189,130, 1,210,589, 2,008,024, 1,946,803, and 502,378. In U.S. Pat. No. 1,189,130, bran, such as wheat bran, is mixed with up to 50% of whole wheat or other gelatinous cereal flour, and is cooked in pans in a stream retort. The cooked product is dried to form lumps and the lumps are then fed through shredding mills. In U.S. Pat. No. 1,210,589, a composite cereal product is formed by mixing bran, shredded wheat, and syrup, molding the mixture and then baking it. In U.S. Pat. No. 2,008,024, a cereal biscuit is prepared by steaming or boiling wheat, surface drying the cooked product, and then converting it into a thin ribbed sheet. The shredding rolls are spaced sufficiently apart so that a sheeted material with ribs is obtained instead of a shredded product. In U.S. Pat. No. 1,946,803, rice, alone or in combination with bran, is steam cooked, dried and cooled to a rubbery consistency and optionally held for tempering to effect a uniform water distribution. This product is then passed between grooved rollers to form long flat ribbons. These ribbons are dried to produce a brittle product which is broken and then puffed by toasting. In U.S. Pat. No. 502,378, a cereal grain is prepared for shredding by boiling, steaming, steeping or soaking. Depending upon the spacing between the rollers, a product in the form of threads, lace, or ribbons, or sheets, and the like, is obtained.

Processes for the production of shredded oat cereals wherein considerable tempering is used, as in the conventional process for the production of shredded wheat, are disclosed in U.S. Pat. Nos. 1,170,162, 1,197,297, and 4,004,035. Tempering of cooked oats is also disclosed in U.S. Pat. No. 3,733,206. However, in the process of the latter patent, the biscuits contain flaked compacted cereal grains as opposed to shreds. In U.S. Pat. No. 1,170,162 and in U.S. Pat. No. 1,197,297, the whole berry is pulverized so as to permit flavoring ingredients to be incorporated in the final product. A dough is formed from flour, flavoring, and water. The dough is then cooked, rolled into slabs and then atmospherically dried for a period of 24 to 40 hours. The dried product is toasted, broken into pea size pieces and then shredded. In U.S. Pat. No. 4,004,035, it is disclosed that during the continuous production of shredded biscuits using a press type cutter or rotating contact cutter, to sever the web across the shreds, the tensile strength and stickiness of the shredded material limits the ability of these cutting devices to perform satisfactorily. The shredded material, it is disclosed, tends to adhere to the blade or the blade will not completely sever it. In U.S. Pat. No. 4,004,035, the shredded biscuits are formed by depositing a layer of shredded cereal in zig-zag configuration on a moving belt and then severing the material. However, tempering for a considerable amount of time as in these processes, is undesirable from the standpoint of equipment costs, plant efficiency, and excessive microbial growth. Furthermore, it has been found that when cooked whole oat groats are tempered prior to shredding, shreddability decreases. The deleterious effect of long tempering times upon the shreddability of oats is unexpected in view of the art-taught need to temper wheat to enable its shredding.

Processes for the production of cereal products made from oats without any apparent tempering step, are disclosed in U.S. Pat. Nos. 897,181, 3,062,657, 3,462,277, 3,732,109, and Canadian Pat. No. 674,046. In U.S. Pat. 897,181, the oats are wetted but not cooked and then passed repeatedly between grooved rollers and then baked. The boiling or steaming of the grain, it is disclosed, produces considerable change in the chemical quality of the grain and a number of the nutritious soluble elements escapes from the grain to the water. In the processes of the remaining patents, a shredded product is not produced by means of shredding rolls. In U.S. Pat. No. 3,062,657, flour and water are mixed to form a dough in an extruder. The dough is cooked in the extruder and then tempered in the extruder at a lower temperature. The extrudates are cut into pellets to simulate cooked and dried grains such as corn grits, whole wheat berries, oat groats, rice and the like. The extrudates, it is disclosed, have a moisture content ideal for flaking. It is generally on the order of 18 to 24% by weight, the moisture being uniformly distributed throughout so that the necessity for tempering is entirely eliminated and the extrudate can be immediately transferred to a flaking operation. It is disclosed that it is preferable to further cool the extrudate before it enters the flaking device to optimize flaking properties.

In U.S. Pat. No. 3,462,277, a mixture of flour and water is passed through an extruder to gelatinize the starch while the dough is cooked and transformed into a rubber-like mass. The moisture content of the mixture is 13 to 35%. The continuous U-shaped extrudate is pinched off into segments by cutting rolls to form canoe-shaped cereal products. The separated canoe-shaped pieces are then dried to below 15% moisture.

U.S. Pat. No. 3,732,109, discloses the production of a ready-to-eat oat cereal biscuit by subjecting an oat flour-water mixture to a water boiling temperature and superatmospheric pressure to gelatinize a portion of the starch in the oat flour. The mixture then passes through an orifice and the extruded product is cut into small pieces. The flake-shaped pieces which are formed are dried to a moisture content of from about 2% to about 6% by weight water. The dried flakes are then subdivided, admixed with a syrup, and compacted into the form of a biscuit. The formed biscuits are then dried to a moisture content of from about 4 to 5% by weight.

In Canadian Pat. No. 674,046, a shredded dry oat cereal product is produced without the use of shredding rolls. A dough is cooked in a screw extruder, extruded through orifices to form a strand bundle, and the strand bundle is cut into pieces by a cutting device which may be a pair of rolls.

In the production of a shredded oat cereal by means of shredding rolls, obtaining the cooked oats in a form which will produce continuous shreds is only one of several problems which are encountered. When oats are cooked atmospherically in water, an oatmeal-type product is obtained which sticks excessively to material handling equipment, such as conveyor belts and hoppers, as well as to the shredding rolls. Drying of the cooked product prior to shredding does not solve this problem. Stickiness is experienced upon transport to the dryer. Moreover, when water cooking is limited in time to reduce stickiness, shreds produced from the oats contain white streaks.

Oat groats, as well as oat flour, contain oat gum. The gum, as reported by Shukla, T., "Chemistry of Oats: Protein Foods and Other Industrial Products", *Critical Reviews in Foods Science and Nutrition*, pps. 383–424 (October 1975), is soluble in water at ambient temperature and is believed to be responsible for the gelatinous property of oatmeal. The cooking of oat groats atmospherically in water results in excessive extraction of the gums from the interior of the oat groat to the surface. The presence of the oat gums at the surface impedes the penetration of water into the oat groat for gelatinization of the oat starch.

Additionally, white streaks are also produced by overcooking the oat groats. It is believed that overcooking either results in bursting of the starch granules to expose white materials or results in a reaction product which is white. It has also been found that pressure cooking the oat groats with steam so as to provide a moisture content in the cooked groats which is sufficiently high to obtain a shreddable product also results in the development of white streaks.

Cooking to eliminate white centers in grains is taught in U.S. Pat. No. 2,421,216. Particles of cereal grains such as corn, rye, wheat, bran, rice, or oat groats are composited with particles of de-fatted soya beans in the form of grits, flakes, or meal to enhance the protein content of the cereal by use of a two-stage pressure cooking step.

The cereal grain is first cooked with flavoring solution in a rotary steam cooker. The cooker is maintained at from about 15 to about 20 lbs. steam pressure. Means are provided for the admission and discharge of steam, so as to permit the cooking to be carried out at a temperature of from about 250° F. to about 260° F. The flavoring solution is an aqueous solution containing about 8% sugar, 3.5% salt, and a small percentage of malt extract. The amount of the flavoring solution which is added to the cereal grain particles is in proportion to the original moisture content of the cereal grain. It is added in an amount so that the amount of moisture in the particles on leaving the cooker is from about 30 to about 45%. The de-fatted soya is separately tempered with about one part by weight of flavoring solution to about 3 parts by weight of de-fatted soya bean particles so that all of the solution becomes absorbed by the de-fatted soya bean particles. The cooking of the cereal is interrupted for the addition of the tempered soya. The cereal and the tempered soya are then cooked under substantially the same conditions of steam pressure to which the cereal was subjected during the initial cooking period.

The total cooking period to which the cereal component is subjected to should, according to U.S. Pat. No. 2,421,216, be such that the starches are hydrolyzed and highly dextrinized and the particles superficially gelatinized with no free starch or white center. The cereal particles, it is taught, should also have a light adhesive action on the intermediately added soya bean particles. The mixed mass of cereal and soya which is removed from the cooker, has a moisture content from about 30 to about 45%. This mass is then dried to a moisture content of from about 24 to about 32% using air at about 130° F. The dried mass is then tempered for about 15 to 30 minutes before shredding in a shredding mill wherein the particles of soya become substantially uniformly spread out over and mixed with the cereal particles and adhered thereto by pressure through the shredding rolls. The shredded product is cut on a rotary cutter, dried on a rotary drier to about 20 to 28% moisture, dried in an oven to about 7 to 15% moisture content, and toasted to a moisture content of about 2.5%. From about 15% to as high as about 40% of de-fatted soya bean particles, based upon the weight of soya bean and cereal is used.

According to U.S. Pat. No. 2,421,216, the soya must be de-fatted so as to permit proper processing or good shredding in the mills. The de-fatted soya, which adheres to particles of the cereal, is believed to provide strength to the shredded product thereby enabling continuous shredding. In the case of oat groats, in Example V, the oat groats are first tempered, steamed and bumped or deformed prior to cooking them in the pressure cooker. This pretreatment would increase surface stickiness, which is desired for adhesion of the soya particles to the oat particles. It is believed that the soya particles, in adhering to the particles of cereal, tie up the sticky gums and starches on the cereal thereby reducing adhesion of the cereal particles to the material handling equipment.

The two-stage cooking of cereal grains is also disclosed in U.S. Pat. Nos. 3,512,990 and 3,787,584. In the process of the former patent, the dough, made from farinaceous materials such as wheat, corn, oats, rice potatoes, or legumes, is optionally partially or completely cooked with added moisture, to an approximate moisture content of about 30%. After this cooking step, the mixture is rendered homogeneous by passing it through an extruder, for example. The extruded product is dried to an approximate moisture content of 22 to 24%. The dried dough is then compacted between two rolls to provide a shredding effect and produce a sheet of dough having diamond-like regularly spaced perforations. The sheet of dough is then severed into strips, folded to form small biscuits which are closed on three sides and then deep fried.

In U.S. Pat. No. 3,787,584 an emulsifier free instant-type corn grits food product is produced by heating a mixture of corn grits, water and polysaccharide gum in a critical temperature range for a critical time period. The heated mixture is then heated in a second heating step which consists of a critical temperature range. The mixture is dried as a thin sheet on a drum dryer and then the cooked, dried sheet is comminuted. The first heating step is conducted at a temperature of from 60° C. to 80° C. so that the starch does not "set" or does not substantially gelatinize. In the second heating step, the mixture is heated to a temperature of from 90° C. to 100° C. The heated mixture is dried within 2 minutes of the time that the second heating step is accomplished. Polysaccharide gums, it is disclosed, are also used in the production of instant oatmeal.

In U.S. Pat. Nos. 987,088, 1,019,831, and 1,021,473, corn or another grain is ground and immersed in an amount of water which is limited to that which will be taken up by the grain during cooking. The purpose of this is to preserve in the cooked article the aroma and other properties of the grain which might otherwise be carried off or dissipated by the evolution of steam or vapor. In these processes, the cooked dough is extruded through a perforated plate to obtain filaments. However, in the production of a shredded oat product, if the moisture content of the oats is too low, either because of cooking in an insufficient amount of water or because of drying after the cooking step, consistent production of continuous shreds on shredding rolls cannot be achieved.

The present invention provides a process for the production of ready-to-eat shredded oat cereals made from whole groat oats alone or in combination with other cereal grains which have the shredded appearance and texture of shredded whole wheat. The cooked and cooled oats are in the form of discrete, individual or non-interconnected particles, which have good flowability through material handling equipment, do not exhibit a "tunneling effect" when flowing through hoppers, are readily shreddable into strong continuous shreds on a consistent basis using shredding rolls and the baked product is free of white streaks or white spots. The process can be conducted continuously without a tempering step which reduces operating and equipment costs. Additionally, material handling equipment, shredding equipment, and baking equipment conventionally used in the production of shredded wheat can be used in the process of the present invention. Accordingly, existing plants for the production of shredded whole wheat can readily be adapted to the production of shredded oats without substantial equipment modification.

SUMMARY OF THE INVENTION

The present invention relates to a process for the production of shredded oat food products, such as ready-to-eat breakfast cereals having the shredded appearance and texture of shredded whole wheat. White streaks or spots in the final product, which result from uncooked grain or overcooked grain, are eliminated by pressure cooking the oats in at least two stages, the amount of water used in the first pressure cooking stage being limited to partially gelatinize the starch without substantial extraction of water soluble starches and gums to the surface of the oat particles. The amount of water used in the remaining pressure cooking stage or stages should be sufficient to eliminate at least substantially all of the white portions in the oat particles and to provide a water content in the oat particles which is sufficiently high to enable continuous shredding on shredding rollers. Additionally, the amount of water in each of the remaining stages should be limited to avoid substantial extraction of the gums and water soluble starches to the surface of the partially cooked oat particle.

The multi-stage pressure cooking step is followed by a cooling step which stops further cooking, partially dehydrates the cooked grain, and produces a non-sticky surface on the cooked grain. The non-sticky surface permits movement of the cooked, non-interconnected oat particles through material handling equipment such as screw conveyors, flow tubes and hoppers. No tempering of the cooked oats is required before shredding. Accordingly, the process can be carried out in a continuous manner without the need for multiple tempering vessels. The cooled, surface-dried product is shredded using shredding rolls, and baked in conventional equipment used for the production of shredded whole wheat. Whole oat groats are the preferred form of oat particles for use in the multi-stage pressure cooking step of the present invention. Shredded cereals made from mixtures of oats with other grains, can be made in the process of the present invention by admixing the cooled, surface dried oats with at least one other cooked, shreddable grain prior to shredding.

DETAILED DESCRIPTION OF THE INVENTION

The process for producing the shredded oat food products of the present invention comprises subjecting oat particles to a pressure cooking step in at least two stages to eliminate at least substantially all of the whiteness of the oat particles, cooling and surface drying the cooked oat particles to obtain discrete, individual or non-interconnected free-flowing oat particles, shredding the surface-dried oats, forming the shredded product into pieces, such as biscuits, and baking the pieces.

The oat particles (also referred to as oats) which are subjected to the multi-stage cooking step of the present invention are preferably whole oat groats. Commercially available whole oat groats, either steamed or unsteamed, can be used. Steamed oats are preferred because the steaming reduces enzymatic activity which increases storage life of the raw material. Bumping of whole oat groats tends to increase extraction of gums and starches during cooking which increase stickiness and is, therefore, not desirable. Commercially available steel cut or fine ground oats are not desirable because they tend to become too sticky upon cooking. Other oat products in pellet form, approximately the size of uncooked oat groats, such as pelletized ground or steel cut oats however, are suitable. Pelletization can be accomplished on conventional pelletizing equipment. However, pelletization adds steps, making pellets more costly to use, than whole oat groats.

The amount of water used in each pressure cooking stage, and the duration and temperature of the cooking should provide for sufficient migration of the water into the oat particles to gelatinize it. However, these parameters should be limited so as to prevent substantial outward migration or extraction of the water soluble starches and gums. Higher amounts of water are used in the second and any subsequent pressure cooking stages, to eliminate whiteness in the oat particles. However, substantial extraction or migration of the water soluble starches and gums is still avoided in the second and subsequent stages. It is believed that in the first stage, gelatinization occurs predominantly in the outer layer of the oat particle. This gelatinized outer layer then presents a greater barrier to outward migration of the gums and water soluble starches than to the inward migration of water for further gelatinization of starch in the inner layers.

In the first stage of the cooking step, the oats are pressure cooked to achieve a moisture content in the oat particles generally in the range of about 15% to about 25% by weight, preferably about 20% by weight, based upon the weight of the oat particles at the end of the cooking stage. Thus, these weight percent ranges take into account the initial moisture content of the oat particles and the amount of water which is absorbed or which migrates into the oat particles during the cooking. Commercially available whole oat groats typically have a moisture content of about 10 to 12% by weight. The amount of water which is added to the first stage cooker, for cooking the oat particles is limited so as to achieve the above moisture content range of about 15 to 25% by weight, preferably about 20% by weight, assuming that all of the water which is added is absorbed by the oat particles. Generally, most of the water is supplied to the cooker as hot water. The remaining portion of this water, typically less than about 5% by weight, is produced by condensation of some of the steam supplied to the cooker. If larger amounts of water are used, the gums tend to be excessively extracted to the surface and apparently prevent sufficient water transfer to the center of the oats to enable cooking of the interior portions of the oat particles.

The steam pressure in the first stage cooking should typically be between about 10 p.s.i.g. to about 25 p.s.i.g., preferably from about 15 p.s.i.g. to about 20 p.s.i.g. The steam supplied to the first stage cooking can be superheated or almost saturated so as to minimize steam condensation which results in better control over the weight percentage of water used for cooking the oat particles. The temperature within the cooker during the first stage cooking should range from about 240° F. to about 260° F., preferably from about 250° F. to about 260° F. At temperatures above about 260° F. the oats tend to become too mushy and sticky, and tend to produce poor quality shreds. At temperatures below about 240° F. the oats are drier but white spots and weaker shreds tend to result. The cooking time in the first stage should range from about 10 minutes to about 25 minutes, preferably from about 15 minutes to about 20 minutes. If shorter cooking times are used, shred strength deteriorates. Longer cooking times further extract the gums, and excessive stickiness, a decrease in the flowability of the cooked oats and white spots in the cooked product tend to result. In the first stage pressure cooking, approximately 15% to about 33% by weight of the starch, more preferably about 17% to about 25% by weight of the starch, is gelatinized at the end of the first stage. Further gelatinization in this stage tends to result in weaker shreds.

The weight percent of the starch which is gelatinized, or the degree of gelatinization, is determined spectrophotometrically. First, the gelatinized starch is measured, then the total starch is measured. The procedure is:

A. Gelatinized Starch: 2.00 g of cooked oats are shredded on a shredding roll and then blended with 95 ml $H_2O$ and 5 ml of 1N NaOH in an Osterizer jar at high speed for three minutes. The blend is then transferred to a 200 ml volumetric flask and water is added to the 200 ml mark. The mixture is then centrifuged at 3000 rpm for 10 minutes. A 2 ml aliquot of supernatant liquid is then pipetted into a beaker containing 15 ml of water and 0.45 ml of 1N NaOH. The pH is adjusted to 7.0±0.5 by dropwise addition of 0.1 N HCl or 0.1 N NaOH as needed. The resulting solution is then transferred to a 100 ml volumetric flask, followed by addition of 1 ml of iodine reagent. The iodine reagent contains one part of iodine ($I_2$) per four parts of KI by weight. Addition of the iodine reagent turns the solution blue. Water is added to the solution to bring the volume up to the 100 ml mark. After five minutes, the absorbance of the solution at 600 nm is measured on a spectrophotometer.

B. Total Starch: Another 2.00 g of the cooked oats are shredded on a shredding roll and then blended with 50 ml of boiling water at high speed for three minutes. The blend is then cooled to room temperature. Then 50 ml 1N NaOH are added to the cooled blend followed by gentle mixing for five minutes. The mixture is transferred to a 200 ml volumetric flask and diluted with water up to the 200 ml mark. The mixture is centrifuged and further treated as in Step A except that the 0.45 ml NaOH is not added. The degree of gelatinization is the absorbance measured in Step A divided by the absorbance measured in Step B times 100.

In the second cooking stage, the weight percentage of water is greater than the weight percentage of water used in the first cooking stage. Having accomplished the conversion of a significant portion of the white interior of oat groats, for example, to a light tan color in the first stage, further gelatinization of the starch is accomplished in the second stage to eliminate at least substantially all of the white portions in the oat particles. At the end of the second stage approximately 37% to 50% by weight of the starch is generally gelatinized. Higher degrees of gelatinization here also tends to result in weaker shreds.

The amount of water added in the second stage should be limited so as to achieve a moisture content of about 40% by weight to about 50% by weight, based upon the weight of the oat particles at the end of the second stage cooking step, assuming that all of the water which is added is absorbed or migrates into the oat particles. Generally, most of the added water is added as hot water. The remaining portion of this water, typically less than about 5% by weight, is produced by condensation of some of the steam supplied to the cooker. If larger amounts of water are used, then the exterior of the oats tend to become excessively sticky thereby hampering subsequent transport of the cooked oats to and through the shredding equipment.

In each cooking stage the temperature of the water which is added should preferably be relatively high so as to reduce heat-up time and to avoid excessive cooling of the oats. Prior to the start of any cooking, the water which is added can be at about 50° F. to about 170° F., for example. Water temperatures of about 150° F. to about 190° F. are suitable in subsequent cooking steps. Water addition should be done as quickly as possible to avoid excessive extraction of water soluble starches and gums which tends to occur under atmospheric conditions. It is preferable to add all of the water in a subsequent cooking stage within about 3 minutes. This can be accomplished by means of a pump, preferably without depressurizing the cooking vessel.

The steam pressure used in the second stage should also be between about 10 p.s.i.g. to about 25 p.s.i.g., preferably from about 15 p.s.i.g. to about 20 p.s.i.g.. As with the first stage cooking, the steam is preferably supplied as superheated steam or as almost saturated steam. The cooking temperature should also be from about 240° F. to about 260° F., preferably from about 250° F. to about 260° F., for about 25 minutes down to about 10 minutes preferably about 20 minutes down to about 15 minutes.

The two cooking stages can be in the same cooking vessel or in serially operated vessels. The former is preferred because it requires less handling of the oats. At the end of the first stage cooking, fresh water is added to the cooker to increase the water content to the above-described range and the second stage cooking is commenced. The time lapse between the first stage cooking and the second stage cooking should be kept to a minimum not only to reduce operating times, but also to avoid unnecessary tempering.

If the oats are tempered before shredding, shred strength decreases with increased tempering times. Continuous shreds which are strong enough to be easily handled in shredding roll operations cannot be obtained with tempering times over about four hours. This is surprising because it has been necessary to temper wheat for longer periods of time to obtain proper shreds. In the production of shredded oats according to the process of the present invention, no tempering before shredding is preferable so as to permit a continuous process and to increase shred strength. However, if tempering is used, it is accomplished by limiting tempering time to about less than four hours.

A two-stage cooking step is preferred over three or more cooking steps because it involves less material handling. Either of the two cooking stages described above can each be performed in more than one stage so as to prevent the substantial extraction of gums and water soluble starches and to prevent the buildup of a barrier on the oat particles to water penetration. Cooking times, temperatures, steam pressures, and amounts of water used in any additional stages should generally be within the above-described ranges.

Pressure cooking in only one stage by continuous addition of water during cooking would require controlled water addition to the oats such that the rate of absorption of water by the oats does not result in excessive extraction of the water soluble gums and starches. While such a one-stage pressure cooking step can be used, it is less preferred than a multi-stage pressure cooking step because of difficulty in controlling the water addition. First, the moisture absorption curve of the oats can vary significantly from one batch to another. Moreover, addition of the water on a continuous basis tends to cause condensation of the steam in a substantially unpredictable manner which makes it difficult to accurately control the total amount of moisture absorption by the oat particles. Also, higher equipment costs would be involved for continuously controlling the addition of water into a pressurized vessel.

After cooking, the oat particles are cooled and surface dried to stop further cooking of the oat particles and to produce free flowing individual non-interconnected oat particles. The non-sticky surface produced on the oat particles permits movement of the cooked oat particles through material handling equipment such as screw conveyors, hoppers, and flow tubes. Suitable temperatures to which the oat particles are cooling range from about 50° F. to about 80° F., preferably from about 60° F. to about 70° F. The cooling and surface drying should typically be accomplished within about 5 minutes to about 10 minutes. The cooling and surface drying are preferably performed simultaneously. Approximately one percent to four percent moisture, based upon the weight of the wet cooked oats, should be removed during surface drying.

Upon removal from the cooker, the oat particles are considerably free flowing, but the cooling and surface drying further reduces stickiness to the point where at least substantially all of the oat particles are discrete and will flow individually through a hopper without exhibiting a tunneling effect. Cooling and surface drying should be accomplished as rapidly as possible, preferably within about 5 minutes, most preferably within about 2 minutes, after the second stage cooking to minimize stickiness. Also, depending upon ambient conditions, particularly temperature and humidity, cooling and/or surface drying can be carried out advantageously throughout, or at other points during, transport of the oat particles to the shredding rolls. Under hot, high humidity conditions, moisture will tend to collect on the oat particles which could increase stickiness.

Cooling and simultaneous surface drying is preferably accomplished using ambient air. However, other cooling and/or surface drying processes such as refrigeration, vacuum cooling, or combinations of processes, can also be used.

For optimum shreddability, the moisture content of the cooked, cooled, surface dried oat particles should be about 39% to about 43% preferably about 40% to about 42% by weight based upon the weight of the oat particles. These moisture contents can be achieved in the cooling and surface drying step or by additional drying. Typically, the additional drying can be at temperatures in the rang eof from about 60° F. to about 100° F. for about 10 minutes down to about 5 minutes. At moisture contents below about 28%, shreddability of the oat particles deteriorates rapidly. The particles tend to crumble or shreds which are produced are of low strength, thereby hampering the production of long continuous shred layers on a shredding roll. Moisture contents of from about 28% to about 49% based upon the weight of the oat particles are suitable for shredding on shredding rolls.

The dried oat particles are then transferred, suitably by means of belt conveyers, to a hopper which feeds a screw conveyer. The latter transfers the oat particles to a series of conventional shredding rolls or mills via flow tubes or hoppers. The shreds, which can be produced in the form of net-like sheets by each set of shredding rolls, are layered, cut, dried, baked, toasted, and then the pieces are packaged all in known manner as for the production of shredded whole wheat biscuits. These layered sheets can be cut to form spoon-size rectangular biscuits or other shapes typical of ready-to-eat breakfast cereals, biscuits or crackers. Temperature profiles used in the oven for drying, baking and toasting of the oats can generally be the same as those used in producing shredded wheat biscuits. A suitable temperature profile ranges from about 600° F. at the entrance to the oven to about 150° F. at the exit of the oven. The total time for drying, baking, and toasting ranges from about 6 minutes to about 8 minutes.

Commercially available processing equipment can be used in the present invention. The pressure cooker should be of the type wherein steam can be passed in direct contact with the oats, and removed while the vessel is agitated and/or rotated. Suitable pressure cookers for use in the first stage and second stage cooking include a Lauhoff cooker, Buhler cooker or Baker Perkins cooker. For transporting the cooked product after it is removed from the second stage pressure cooker, a shaker conveyor, such as a Rexnord carrier can be used. Suitable tempering equipment includes a flat belt or bins.

Prior to cooling the cooked product, it is preferable to subject it to a lump-breaking operation in a rotary lump breaker such as a Jacobsen lump breaker. The cooked oats are preferably cooled and simultaneously surface dried on a cooling reel, such as one manufactured by Littleford, in a Hess grain-type dryer, in a vibrating screen cooler, in a Wolverine ® continuous cooler, or combinations thereof. In the Wolverine ® cooler, jets of cool air impinge on the vibrating oats from above to fluidize the oat particles and thereby cool and surface dry them. Other suitable cooling means include vacuum vessels and refrigerated conveyors.

Exemplary of the types of dryers which can be used to additionally dry the cooled, surface dried oats are belt or conveyor dryers, vacuum dryers and the like.

Shredding systems which can be used in the process of the present invention may comprise conventional rolls and devices such as those indicated in U.S. Pat. Nos. 502,378, 2,008,024, 2,013,003, 4,004,035, and Canadian Patent No. 674,046. A conventional shredding mill for use in the process of the present invention comprises a pair of closely spaced rolls that rotate in opposite directions, with at least one of the rolls having circumferential grooves. Upon passing between the rolls, the wheat is deformed into long individual strings or shreds. The circumferentially grooved roll can also be grooved transversely to the circumferential grooves for the production of net-like sheets. When the rollers are held to roll in mutual contact, the shreds or filaments will be fairly separate from each other, though more or less contacting, but when the rollers are sprung slightly apart, under pressure, the adjacent filaments may be united to each other by very thin translucent, almost transparent, webs or fins between them.

The shredding mills are typically arranged in a linear series along a common conveyor, with the shreds running longitudinally or in parallel with the direction of movement of the conveyor. The sheets or layers of filaments are deposited on the conveyor in super-position, with their filaments running in the same direction. A typical biscuit, for example, may contain up to 21 individual layers of shreds. Upon obtaining the requisite thickness, the multiple layer web can be cut transversely and longitudinally into multiple lines of biscuits in known manner. The cutting can be completely through the laminate to form the individual biscuit shapes prior to baking. Cutting partially through the laminate to form biscuit shapes, followed by baking, and separating the baked partially cut laminate into individual biscuits in known manner is preferred for easier control of the orientation of the cut product as it passes through the baking oven.

Suitable ovens for drying, baking and toasting the shredded product include Proctor & Schwartz, Werner Lahara and Spooner ovens containing forced air and gas fired burners and a conveyor.

Many grains require different cooking times, different tempering times and different temperatures to obtain optimal flowability properties, shred strength, appearance, and the like. Accordingly, to produce a cereal product having a mixture of different types of cereal grains in each biscuit, it is preferable to separately process each type of grain and to then co-shred the grains. It is also possible to combine the separate grains by separately shredding the grains and then layering the shreds of the different grains.

The other grains can be prepared for shredding by conventional methods or by the process of the present invention. Exemplary of the other grains are barley, rye, corn, wheat, combinations thereof, and the like. Use of the multi-stage pressure cooking step of the present invention has been found to eliminate the need for or reduce the amount of tempering of these grains. Steam pressures, cooking times, and temperatures, cooling conditions, drying and baking conditions can generally be the same as those described above for the production of shredded oats. Adjustments, however, can be made to achieve optimum flowability and shreddability by slight changes in moisture content, steam pressure, and cooking time.

The oats can be cooked with one or more other food ingredients at the usual levels of concentration, which do not interconnect the oat particles or otherwise interfere with the attainment of individual, discrete, free-flowing oat particles, for the continuous production of shreds. Thus, for example, the oats can be cooked with a sugar such as sucrose, salt, malt, flavoring, food colorant, emulsifier such as Myvatex ® (a blend of distilled monoglycerides manufactured by Eastman Kodak), vitamins and/or minerals. However, products made from only whole oat groats and/or only other grains are preferred because of their appeal as a 100% natural product.

The present invention is further illustrated in the following examples. All percentages, parts, and proportions are by weight and all temperatures are in °F. unless otherwise indicated:

EXAMPLE 1

In this example, both stages of the cooking step are conducted in the same pressure cooker. To a Johnson cooker is added 1,000 lbs. of whole oat groats (commercially available from Con Agra) having a moisture content of about 10 percent by weight (O'Haus). Then 130 lbs. of water, at a temperature of about 55° F. is added to the cooker. The cooker is closed and steam at 15 p.s.i.g. and 100 saturation is passed through the cooker in direct contact with the oats for 15 minutes. The steam is shut off and the cooker is opened for the addition of 425 lbs of water. The water which was added was at a temperature of 150 to 170° F. All of the water was added in less than three minutes. The cooker was then closed, steam was supplied at 15 p.s.i.g. and 100% saturation for an additional 15 minutes as in the first stage. The steam was then shut off and the cooker opened. The cooked oats were dumped onto a shaker conveyor, passed through two lump breakers and then fed to a Littleford cooling reel. Cooling, accompanied by surface drying, was conducted to reduce the temperature of the oats to about 90° F.

The product discharged from the cooling and drying reel was collected in a drying bin equipped with its own fan and perforated screen bottom. The temperature of the air used to further cool and surface dry the product was about 70° F. Drying was conducted for about five minutes to obtain a product having a temperature of about 80° F. and a moisture content of about 42% by weight. The dried product was transported to a shredding line hopper and shredded in a conventional shredder having a five-inch chain conveyor. A shred layer about 4½ to about 5 inches wide was obtained. A laminate of the shred layers is formed and cut to obtain spoon-sized pieces. These pieces were then baked in a Spooner oven for about 7 minutes at a temperature of about 600° F. to produce baked spoon-sized 100% whole oat biscuits having a moisture content of about 5% based upon the weight of the final biscuit product.

The shred quality was strong and the shred layer pattern was the same as the shred pattern of shredded wheat.

EXAMPLE 2

This example is carried out in a similar manner as Example 1 except that the cooked oats are fed to a Wolverine$_R$ continuous cooler instead of to the Littleford cooling reel and drying bin. The oat particles are cooled and surface dried to a temperature of about 80° F. and a moisture content of about 42% by weight, respectively, by the continuous cooler. The shred quality and shred pattern are the same as obtained in Example 1.

What is claimed is:

1. A process for producing a shredded oat food product comprising:
   (a) pressure cooking particles consisting essentially of oats with water in at least two stages to eliminate white streaks or spots in the food prodcut caused by insufficient or overgelatinization of starch, wherein the amount of water added in the first stage is limited to achieve a moisture content in the oat particles of from about 15% to abut 25% by weight, based on the weight of the oat particles at the end of said first stage and the amount of water added in the remaining stages is limited so as to produce a moisture content of from about 40% to about 50% based upon the weight of the oat particles at the end of the final cooking stage, the amount of water added in each stage being limited to avoid substantial extraction of oat gum and water soluble starches to the surfaces of the oat particles, whereby said particles are considerably free-flowing,
   (b) cooling and surface drying the cooked particles so that at least substantially all of the cooked particles are discrete, individually free-flowing and non-interconnected particles,
   (c) shredding the discrete, individually free-flowing particles, and
   (d) forming the shreds into biscuits.

2. A process as claimed in claim 1 wherein the pressure cooking is performed in two stages, the weight percent of the starch which is gelatinized in the first cooking stage is from about 15% to about 33%, and the weight percent of the starch which is gelatinized in the second cooking stage is from about 37% to 50%.

3. A process as claimed in claim 1 wherein the oat particles fed to the first stage cooker comprise whole oat groats.

4. A process as claimed in claim 1 wherein said food product consists essentially of shredded oats.

5. A process as claimed in claim 1 wherein said food product comprises shredded oats and at least one other shredded grain selected from the group consisting of barley, rye, wheat, corn and mixtures thereof.

6. A process as claimed in claim 1 wherein the pressure cooking is conducted at a steam pressure of about 10 p.s.i.g. to about 25 p.s.i.g.

7. A process as claimed in claim 2 wherein the pressure cooking is at a temperature of from about 240° F. to about 260° F.

8. A process as claimed in claim 2 wherein the oat particles obtained in step (b) are further dried to a moisture content of about 39% to about 43% based upon the weight of the oat particles.

9. A process as claimed in claim 2 wherein the cooled surface dried oat particles have a moisture content of about 28% to about 49% based upon the weight of the oat particles.

10. A process as claimed in claim 2 wherein the cooled, surface-dried oat particles are immediately shredded to avoid tempering.

11. A process as claimed in claim 1 wherein said cooling is to a temperature of from about 50° F. to about 80° F. and said cooling and surface drying is accomplished in about five minutes to about ten minutes.

12. A process as claimed in claim 1 wherein said food product is a ready-to-eat cereal consisting essentially of one or more cereal grains.

13. A process as defined in claim 1 wherein from about 15 to about 33 weight percent of the starch in said particles is gelatinized in said first stage and from about 37 to about 50 weight percent of the starch in said particles is gelatinized in the remaining stages.

14. A process as claimed in claim 1 wherein said cooling is to a temperature of from about 60° F. to about 70° F.

15. A process for producing a shredded ready-to-eat cereal substantially free of white streaks from at least one cereal grain selected from the group consisting of oats, barley, rye, wheat and corn comprising:
   (a) pressure cooking particles consisting essentially of cereal grains with water in at least two stages to eliminate white streaks or spots in the cereal caused by insufficient gelatinization or overgelatinization of starch wherein cooking in each stage is conducted at a steam pressure of from about 10 to about 25 psig, achieving temperatures from about 240° F. to about 260° F. for a time of from about 10 to about 25 minutes, the amount of water added in each stage being limited to avoid substantial extraction of gum and water soluble starches to the surfaces of the cereal grains, so that said particles are considerably free-flowing, the amount of water added in the first stage being sufficient to partially gelatinize the starch of the cereal grains, and the amount of water added in the remaining stages being sufficient to eliminate at least substantially all of the white portions in the cereal grains,
   (b) cooling to a temperature of from about 50° F. to about 80° F. within a time of about 5 minutes to about 10 minutes and surface drying the cooked particles so that at least substantially all of the cooked particles are discrete, individually free-flowing and non-interconnected particles,
   (c) shredding the discrete, individually free-flowing particles,
   (d) layering the shredded particles,
   (e) cutting the layered product, and, (f) baking the cut product.

16. A process as claimed in claim 15 wherein the layered product is partially cut into pieces prior to baking and the partially cut pieces are separated after baking.

17. A process as claimed in claim 15 wherein said cooling is to a temperature of from about 50° F. to about 80° F.

18. A process for producing a shredded ready-to-eat oat cereal comprising:
  (a) pressure cooking particles consisting essentially of whole oat groats in the presence of water and steam in at least one stage at a steam pressure of from about 10 to about 25 psig, achieving temperatures of from about 240° F. to about 260° F. for a time of from about 10 to about 25 minutes to eliminate white streaks or spots in the cereal caused by insufficient gelatinization or overgelatinization of the starch, the amount of water added in each stage being limited during the cooking of the oat groats to avoid substantial extraction of oat gum and water soluble starches to the surfaces of the whole oat groats and to produce a moisture content of from about 40% to about 50% based upon the weight of the oat groats at the end of the final cooking stage, so that said particles are considerably free-flowing,
  (b) cooling to a temperature of from about 50° F. to about 80° F. within a time of about 5 minutes to about 10 minutes and surface drying the cooked particles so that at least substantially all of the cooked particles are discrete individually free-flowing and non-interconnected particles,
  (c) shredding the discrete, individually free-flowing particles,
  (d) layering the shredded particles,
  (e) cutting the layered product, and
  (f) baking the cut product.

19. A process as claimed in claim 18 wherein the pressure cooking is performed in a first and second pressure cooking stage, the amount of water in the first stage being sufficient to partially gelatinize the starch of the oat groats and provide a moisture content of about 15% to about 25% by weight, based upon the weight of the oat groats at the end of the first cooking stage, and the amount of water in the second stage being sufficient to eliminate at least substantially all of the white portions in the oat groats.

20. A process as claimed in claim 18 wherein the pressure cooking is performed in a single cooking stage wherein water is continuously added at a controlled rate.

21. A process for producing a shredded oat food product comprising the steps of:
  (a) pressure cooking oat particles with water in a first stage cooker and a second stage cooker to eliminate white streaks or spots in the food product caused by insufficient or overgelatinization of starch, wherein cooking in each stage is conducted at a steam pressure of from about 10 to about 25 psig, achieving temperatures of from about 240° F. to about 260° F. for a time of from about 10 to about 25 minutes, the amount of water in each stage being limited to avoid substantial extraction of oat gum and water soluble starches to the surface of said oat particles, wherein the amount of water added in said first stage is limited to achieve a moisture content in said oat particles of from about 15 to about 25 weight percent, based on the weight of the oat particles at the end of said first stage, and from about 15 to about 33 weight percent of the starch in said oat particles is gelatinized, thereafter adding sufficient water for said second stage to produce a moisture content of from about 40 to about 50 weight percent and to gelatinize from about 37 to about 50 weight percent of the starch in said oat particles, so that said particles are considerably free-flowing at the end of said second stage,
  (b) cooling and surface drying the cooked particles to a temperature of from about 50° F. to about 80° F. within a time of about 5 minutes to about 10 minutes so that substantially all of the cooked particles are discrete, individually free-flowing particles,
  (c) shredding the discrete, individually free-flowing particles, and
  (d) forming the shreds into biscuits.

* * * * *